UNITED STATES PATENT OFFICE.

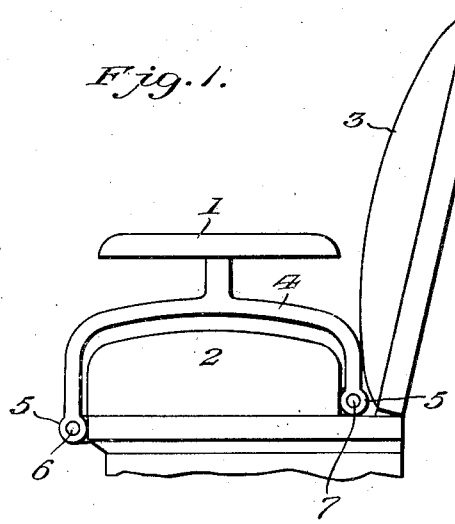
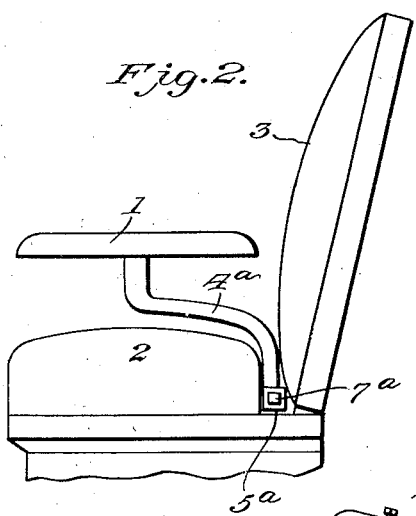
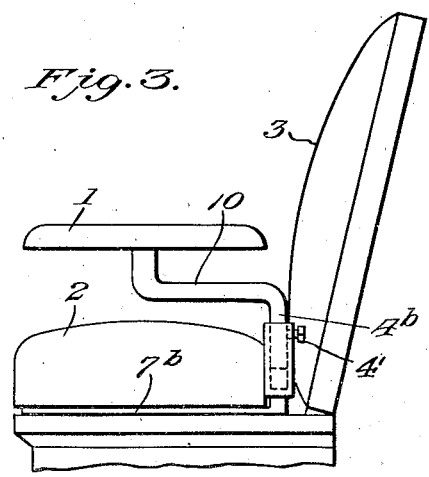
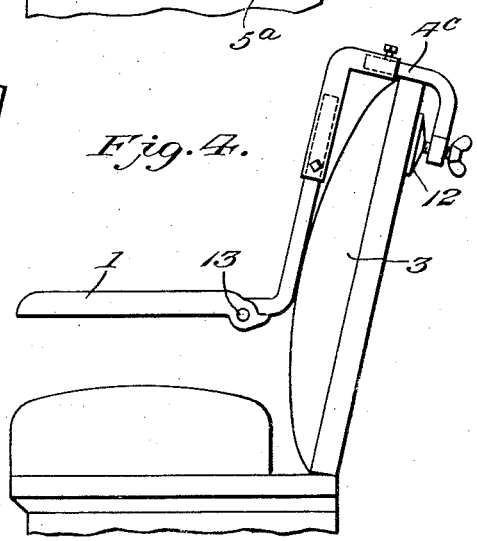
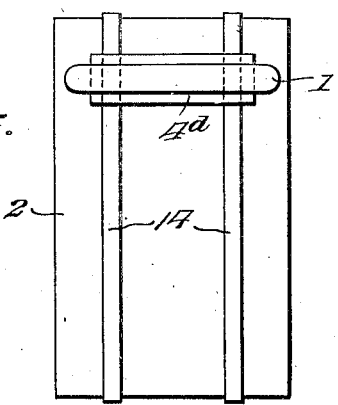
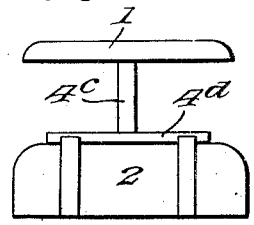

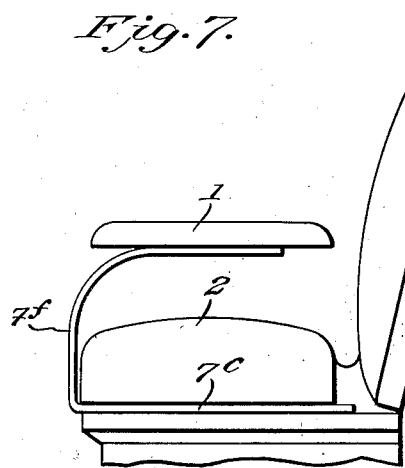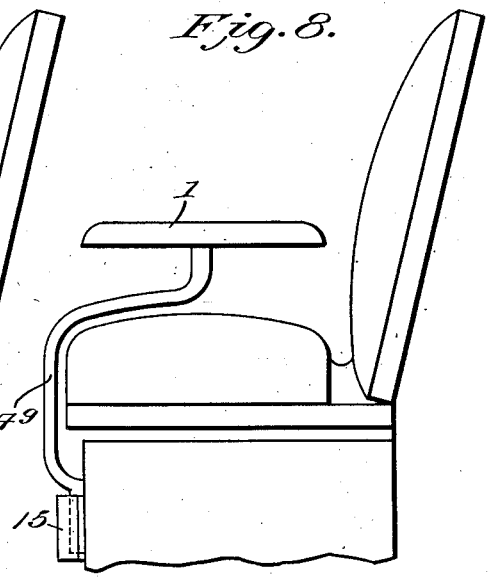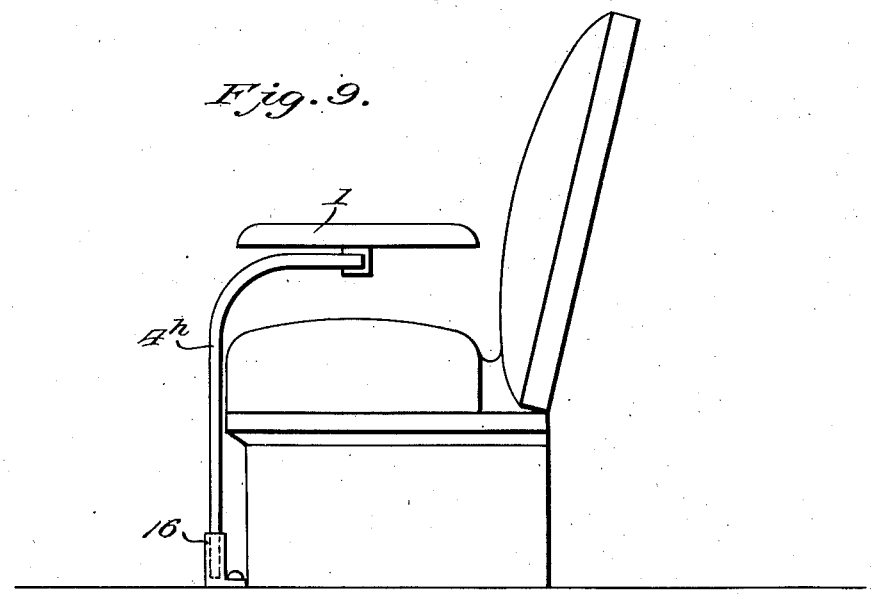

WALTER JAMES McPARTLAND, OF CAMBRIDGE, MASSACHUSETTS.

ARMREST.

1,378,704.  Specification of Letters Patent.  Patented May 17, 1921.

Application filed August 9, 1920. Serial No. 402,143.

*To all whom it may concern:*

Be it known that I, WALTER JAMES MC-PARTLAND, a citizen of the United States, residing at Cambridge, in the county of Middlesex and State of Massachusetts, have invented new and useful Improvements in Amrests, of which the following is a specification.

The object of my present invention is the provision of an advantageous arm rest designed more especially for use in combination with the seats of automobiles, railway cars, and the like.

To the attainment of the foregoing the invention consists in the improvement as hereinafter described and definitely claimed.

In the accompanying drawings, hereby made a part hereof:—

Figure 1 is a view illustrating one embodiment of my invention as properly arranged relatively to the seat cushion and back of an automobile or car seat.

Fig. 2 is a similar view of a modification.

Fig. 3 is a view of the same character of a second modification.

Fig. 4 is a view disclosing a third modification.

Figs. 5 and 6 are views of a fourth modification.

Fig. 7 is a view of a fifth modification.

Fig. 8 is a view of a sixth modification.

Fig. 9 is a view of a seventh modification.

In all of the embodiments illustrated with the exception of Figs. 8 and 9 the arm rest indicated by 1 is adjustable in the direction of the length of the seat cushion 2 and the seat back 3.

By reference to Fig. 1 it will be understood that the embodiment therein includes a support 4 for the arm rest 1. The said support 4 is shaped to straddle the seat cushion 2 transversely, and at its ends the said support 4 is provided with horizontally disposed sleeves 5. These sleeves 5 are slidably arranged on bars 6 and 7 in parallelism with the seat cushion 2; the bar 6 being fixed in front of the seat cushion 2, and the bar 7 being fixed in interposed relation to the seat cushion 2 and the back 3. By virtue of the said construction the support 4 with the arm rest 1 thereon may be quickly and easily adjusted to any point in the length of the seat cushion 2 so as to comfortably support the arm of a person seated on the seat cushion 2 at an intermediate point in the length thereof.

In the modification shown in Fig. 2 a bar $7^a$ is fixed lengthwise of the seat cushion 2 at a point between the back of said seat cushion 2 and the seat back 3, and in conjunction with the said bar $7^a$ is employed a support $4^a$ for the arm rest 1; the said support $4^a$ being in the form of an arm with a sleeve $5^a$ at the lower end thereof slidably arranged on the bar $7^a$. In this embodiment the bar $7^a$ and the sleeve $5^a$ are of rectangular or other angular form in cross section so that the bar $7^a$ and the sleeve will coöperate to prevent canting of the support $4^a$. In this embodiment also the arm rest 1 may be expeditiously and easily located at any desired point in the length of the seat cushion 2.

The modification of Fig. 3 includes a support $4^b$ for the arm rest 1, which support $4^b$ is provided with an offset portion 10, and a plate $7^b$ by which the support $4^b$ is carried. The said plate $7^b$ extends from the back to the front of the seat cushion 2 and is interposed between the said seat cushion 2 and the support on which the seat cushion is superimposed. Manifestly the plate $7^b$ may be readily adjusted in the direction of the length of the seat cushion 2 so as to position the arm rest 1 at any desired point in the length of the seat cushion. When, however, the weight of a person is imposed on the seat cushion 2, such weight will be ample to prevent canting of the support $4^b$. The upright portion of the support $4^b$ is preferably in sections, one section socketed in the other and adjustably fixed to such other by a set screw 4' as shown. I would also have it understood that when deemed expedient the plate $7^b$ can be screwed or otherwise fixed to the underside of the cushion 2.

In the embodiment shown in Fig. 4 the support for the arm rest 1 is in the form of a yoke $4^c$. The said yoke or support $4^c$ is adapted to straddle the seat back 3 and be adjusted lengthwise thereof and to be adjustably fixed to the seat back through the medium of a clamp indicated by 12. The said yoke or support $4^c$ is preferably adjustable as to width to fit it to seat backs of various thicknesses, and its forward pendent portion is preferably adjustable as to length so that the arm rest can be located in working position at various heights.

It will also be noted that in the embodiment shown in Fig. 4 the arm rest 1 is hingedly connected at 13 to a member of the pendent portion of the yoke or support 4ᵉ. By virtue of this provision the device as a whole may be conveniently folded when not in use.

In the modification shown in Figs. 5 and 6 straps 14 of leather or other appropriate material are secured lengthwise above the seat 2, and a support 4ᵈ, is slidably arranged on the said straps so as to be susceptible of adjustment in the direction in the length of the seat. The said support 4ᵈ is provided with an arm 4ᵉ and by the said arm 4ᵉ is carried the arm rest 1.

The modification shown in Fig. 7 is generally analogous to that shown in Fig. 3. In the said embodiment of Fig. 7, however, the support 4ᶠ rises from the plate 7ᶜ at the front of the seat cushion 2.

In the modification shown in Fig. 8 the support 4ᵍ that carries the arm rest 1 is screwed at 15 to a part of the seat while in modification shown in Fig. 9 the support 4ʰ for the arm rest 1 is stepped at its lower end in a bracket 16, appropriately fixed to the floor of an automobile, railway car or the like.

In the Fig. 8 embodiment the support 4ᵍ is preferably seated in a socket, carried by a plate, fixed to the front of the seat as shown.

It will be observed that the embodiments shown in Figs. 8 and 9 lack the capacity of adjustment in the direction on the length of the seat cushion 2. The said embodiments, however, are advantageous in that their parts overhang the seat cushion 2, and also in that their arm rests 1 are conveniently disposed above the seat cushion.

Having described my invention, what I claim and desire to secure by Letters-Patent, is:—

An arm rest for use in conjunction with the seats of automobiles, railway cars and the like, comprising an arm rest, a support therefor adjustable longitudinally of a seat, and longitudinal connections in parallelism to the seat and on which the support is adjustable; the support being maintained above the seat whereby the arm rest may be positioned at various points intermediate of the ends of said seat.

In testimony whereof I affix my signature.

WALTER JAMES McPARTLAND.